Patented Feb. 17, 1953

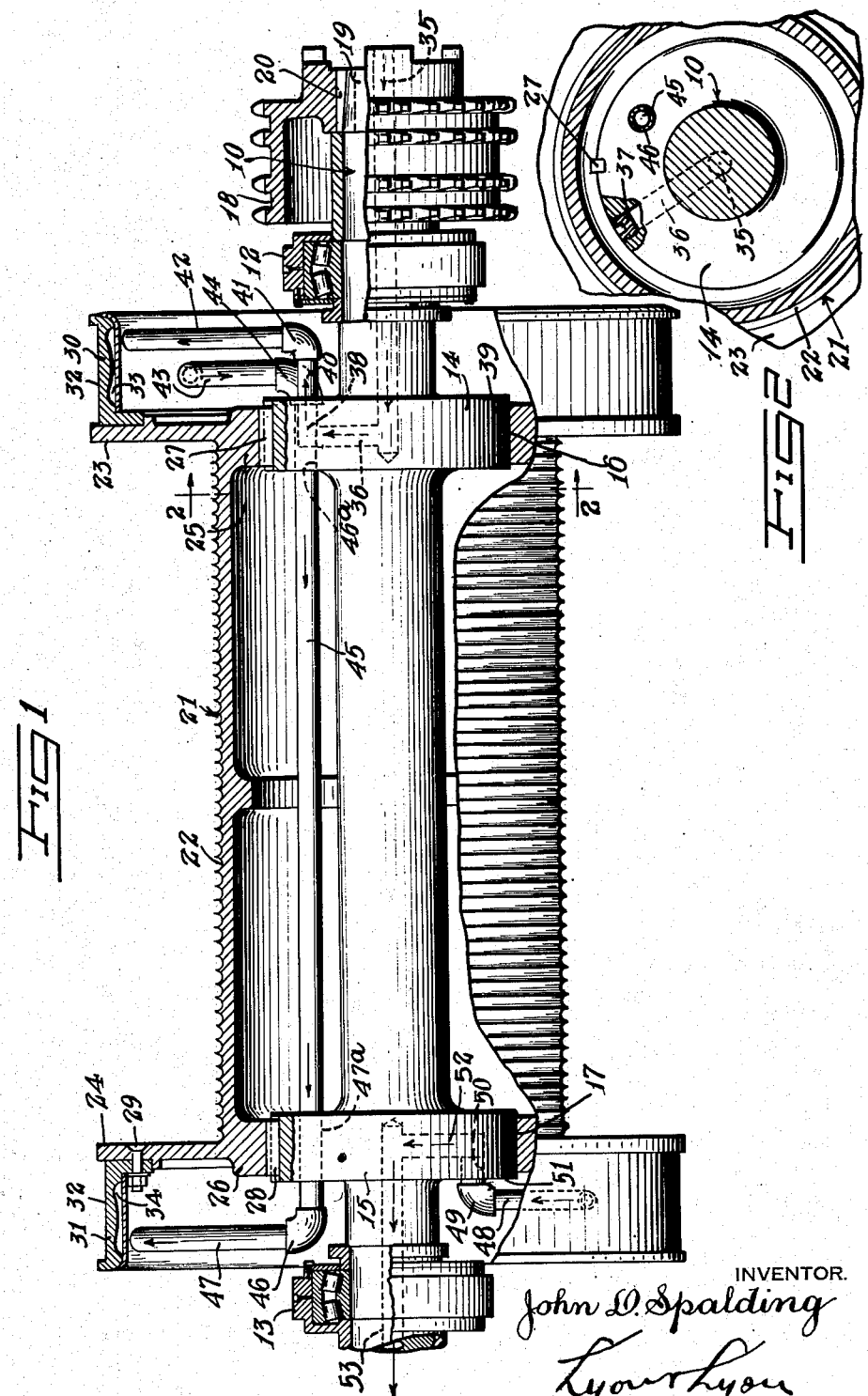

2,628,814

UNITED STATES PATENT OFFICE 2,628,814

DRUMSHAFT ASSEMBLY

John D. Spalding, Torrance, Calif., assignor to The National Supply Company, Pittsburgh, Pa., a corporation of Pennsylvania Application October 16, 1947, Serial No. 780,151

9 Claims. (Cl. 254—186)

This invention relates to hoisting machinery and is particularly directed to improvements in spooling drums and drumshafts. This invention finds particular usefulness in connection with drumshaft assemblies of the type employed in hoists and drawworks used in connection with the drilling of wells.

Oil well drilling machinery ordinarily includes a hoist for winding a cable which is rove between blocks for the purpose of raising and lowering a drill stem in relation to a bored well hole. Such a hoist or drawworks is provided with a rotatable shaft having a cable spooling drum fixed on the shaft. A spooling drum is generally provided with a pair of brake rims over which friction bands are trained. In order to dissipate excessive heat arising through operation of the friction bands on the brake rims, it has become common practice to circulate a coolant such as water through the rims or to spray a coolant onto the rims. Conventional drumshaft assemblies now in commercial use carry coolant to and from the brake rims by way of axial passageways in the shaft, but the conduit leading from the shaft passage to the brake rims ordinarily passes through at least a portion of the spooling drum. Unlike the brake rims and shaft the drum is ordinarily formed of cast material and therefore may have minor defects such as blow holes and porosity which allow coolant under pressure to escape or to leak.

Furthermore, conventional spooling drum and shaft assemblies require that cooling water pass through aligned openings in the periphery of the shaft and bore of the drum hub. This joint between cylindrical surfaces is a source of trouble since leakage and corrosion may develop. Also, such conventional constructions involve a weakening of the shaft in bending at the location of the radial shaft passage. The stress raising characteristics of a drilled hole in the outer fibers of a flexural member such as a shaft are well known. The conventional assemblies having a drum hub pressed on the shaft have a further stress raising effect in the outer shaft fibers adjacent the drum hub.

Accordingly, an important object of my invention is to provide a shaft for a spooling drum, the shaft having axially spaced radially extending flanges formed integrally therewith for supporting the drum.

Another object is to provide a drum shaft assembly having a novel construction enabling coolant to be delivered to or circulated through brake rims fixed relative to the drum without passing through the structure of the drum.

Another object is to provide a drum-shaft assembly including a spooling drum affixed on a shaft and provided with brake rims, the shaft having axially spaced flanges, and means for delivering coolant from the shaft to the brake rims including lateral ports in the side faces of the shaft flanges.

Other objects and advantages will appear hereinafter.

In the drawings:

Figure 1 is a front elevation partly in section showing details of a trunk shaft assembly embodying my invention.

Figure 2 is a transverse sectional view taken substantially on the lines 2—2 as shown in Figure 1.

Referring to the drawings, the shaft 10 may be mounted in spaced bearings 12 and 13 for rotation about its longitudinal axis. The bearings 12 and 13 are carried by stationary supporting means not shown. Formed integrally on the shaft 10 between the bearings 12 and 13 are a pair of radially extending flanges 14 and 15. These flanges 14 and 15 are cylindrical and are concentrically mounted with respect to the shaft axis. The outer diameter 16 and 17 of the flanges 14 and 15 is substantially greater than the diameter of the shaft between the flanges or outside the flanges. The shaft 10 including the flanges 14 and 15 is preferably forged from a single steel billet and then lathe turned to size. A multiple tooth sprocket 18 may be provided for driving the shaft 10 and this sprocket may be mounted on the tapered end 19 of the shaft and secured thereto by means of a key 20.

A spooling drum 21 having a spooling section 22 and end walls 23 and 24, encircles a portion of the shaft 10 and is adapted to be secured thereto. Hubs 25 and 26 are provided on the spooling drum 21 radially inwardly of the end walls 23 and 24, and these hubs each encircle one of the flanges 14 and 15. Means are provided for preventing relative rotation between the hubs and flanges, and as shown in the drawings this means may include the keys 27 and 28.

Fixed to the end walls 23 and 24 as by bolts 29 are the brake rims 30 and 31. Each of these rims includes a peripheral surface 32 over which friction band means not shown are adapted to be trained. In order to dissipate heat generated by the friction bands on the peripheral surfaces 32 annular passageways 33 and 34 are provided within the brake rims 30 and 31 and a coolant is circulated through such passageways. An inlet passageway 35 is formed in one end of the shaft 10 and extends axially thereof to a point radially within the flange 14. A radial hole 36 is drilled from the periphery of the flange 14 to intersect the inlet passageway 35. This drilled hole 36 is plugged as by means of the plug 37 before the drum 21 is assembled on the shaft 10. A lateral port 38 is drilled into the side face 39 of the flange 14 to intersect the drilled hole 36, and this lateral port may be threaded to receive a pipe nipple 40. A pipe L 41 connects the nipple 40 to the pipe 42 which communicates with the annular passageway 33 within the brake rim 30. A return pipe 43 also communicates with the annular passageway 33 and connects at its inner end to a fitting 44. Communicating with the fitting 44 is a longitudinally extending pipe 45 which passes through aligned lateral openings 46a and 47a in the flanges 14 and 15. From the construction just described it will be understood that coolant admitted under pressure into the shaft passageway 35 passes outwardly through the passage or drilled hole 36 and then through the lateral port 38 into the brake rim 30 via the piping 40, 41 and 42.

Return coolant from the brake rim 30 passes radially inwardly through the pipe 43 and fitting 44 into the longitudinally extending pipe 45. Then the coolant in the pipe 45 passes through fitting 46 and pipe 47 into the annular passageway 34 in the brake rim 31 and returns through the pipe 48 and fitting 49 to a lateral port 50 drilled in the side face 51 of the flange 15. A drilled hole 52 in the flange 15 is provided in a manner similar to that described in connection with the drilled hole 36 in the flange 14 and this drilled hole or passage 52 communicates with the discharge passage 53 formed axially of the shaft 10. From this description it will be understood that coolant in the pipe 45 passes through the annular passageway 34 within the rim 31 and returns to the shaft passage 53 via the piping 48 and 49 and flange passages 50 and 52.

It will be observed that the passageways for coolant are present only in the forged steel shaft and its integral flanges, and no coolant passageways are provided within the structure of the drum 21. Difficulties of leakage due to porosity or other minor defects in the material of the drum are therefore eliminated and leakage of coolant is prevented.

Having fully described my invention, it is to be understood that I do not wish to be limited to the details herein set forth, but my invention is of the full scope of the appended claims.

I claim:

1. In a hoist, the combination of a shaft, a concentric flange formed integrally on the shaft and projecting radially therefrom, a spooling drum having integrally formed end walls and a central spooling section therebetween, the drum having a hub encircling said shaft flange and non-rotatably fixed thereto, a brake rim fixed relative to one of the end walls of the spooling drum, conduit means for delivering a coolant to said brake rim, said conduit means including an axially extending passageway in the shaft, a passage in the flange communicating with the shaft passageway, a lateral port in a side face of the shaft flange communicating with said passage, and pipe means connecting the lateral port with the brake rim.

2. In a hoist, the combination of a shaft, a flange formed integrally on the shaft and projecting radially therefrom, the flange having a cylindrical periphery, a spooling drum having integrally formed end walls and a central spooling section therebetween, the drum having a hub with a cylindrical bore encircling said shaft flange and non-rotatably fixed thereto, a brake rim fixed relative to one of the end walls of the spooling drum, conduit means for delivering a coolant to said brake rim, said conduit means including an axially extending passageway in the shaft, a passage in the shaft flange extending outwardly from the shaft passageway toward the periphery of the flange, and a lateral port in a side face of the flange communicating with the passage.

3. In a hoist, the combination of a shaft, axially spaced bearings for rotatably supporting the shaft, a pair of axially spaced cylindrical flanges formed integrally on the shaft between said bearings, the flanges being of substantially greater diameter than the shaft, a spooling drum provided with axially spaced inwardly extending hubs each encircling one of said shaft flanges, each flange supporting one of the hubs, means on the periphery of at least one flange for preventing relative rotation between the flange and the encircling hub, said means including an axially extending keyway in the periphery of the flange, the bottom of the keyway being positioned radially outwardly of the shaft.

4. In a hoist, the combination of a shaft, axially spaced bearings for rotatably supporting the shaft, a pair of axially spaced cylindrical flanges formed integrally on the shaft between said bearings, the flanges being of substantially greater diameter than the shaft, a spooling drum having end walls formed integrally with a spooling section, said drum also having axially spaced hubs formed integrally therewith and positioned radially inwardly of said end walls, the hubs being supported upon and each encircling one of the shaft flanges, means for preventing relative rotation between the drum hubs and the shaft flanges, said means including an axially extending keyway on each of the shaft flanges, the bottoms of the keyways being positioned radially outwardly of the shaft.

5. In a hoist, the combination of a shaft, a concentric flange formed integrally on the shaft and projecting radially therefrom, a spooling drum having a hub mounted on and encircling the shaft flange and non-rotatably fixed thereto, a brake rim fixed relative to the spooling drum, conduit means independent of the drum hub for delivering a coolant to said brake rim, said conduit means including a lateral port in a side face of said shaft flange, a radially outwardly extending passage in the shaft flange communicating with the lateral port, and an axially extending passageway in the shaft communicating with said passage.

6. In a hoist, the combination of a shaft, axially spaced flanges formed integrally on the shaft and projecting radially therefrom, a spooling drum provided with spaced hubs each mounted on and encircling one of said shaft flanges and being nonrotatably fixed thereto, brake rims fixed relative to the spooling drum, conduit means for delivering a coolant to each of said brake rims, said conduit means including a lateral port in a side face of each of said flanges, a radially outwardly extending passage in each flange communicating with its respective lateral port, and axially extending passageways in the shaft each communicating with one of said passages.

7. In a hoist, the combination of a shaft, axially spaced bearings for rotatably supporting the shaft, a pair of axially spaced cylindrical flanges formed integrally on the shaft and positioned between said bearings, the flanges being of substantially greater diameter than the shaft, and a spooling drum provided with axially spaced hubs each mounted on and encircling one of the shaft flanges, and means engaging said hubs and flanges and wholly positioned radially outwardly of the shaft for preventing relative rotation between said spooling drum and said shaft.

8. In a hoist, the combination of a shaft, a concentric flange formed integrally on the shaft and projecting radially therefrom, a spooling drum having an inwardly extending hub encircling said shaft flange and being nonrotatably fixed thereto, a brake rim fixed relative to the spooling drum, conduit means for delivering a coolant to said brake rim, said conduit means including a lateral port in a side face of said shaft flange, a passage in the shaft flange communicating with said lateral port, and an axially extending passageway in the shaft communicating with said passage.

9. In a hoist, the combination of a shaft, axially spaced bearings for rotatably supporting the shaft, a pair of axially spaced cylindrical flanges formed integrally on the shaft between said bearings, the flanges being of substantially greater diameter than the shaft, a spooling drum having axially spaced hubs mounted on said shaft flanges, means on the periphery of the shaft flanges for preventing relative rotation between the drum hubs and the shaft flanges, said means including key means extending axially of the shaft and being wholly positioned radially outwardly of the shaft.

JOHN D. SPALDING.

REFERENCES CITED

The following references are of record in the file of this patent:

UNITED STATES PATENTS

| Number | Name | Date |
|---|---|---|
| 1,906,519 | Bloss | May 2, 1933 |
| 1,924,216 | Smith et al. | Aug. 29, 1933 |
| 2,240,741 | Spalding | May 6, 1941 |
| 2,507,256 | Keim | May 9, 1950 |